Feb. 9, 1926.　　　　　　　　　　　　　　　　　　　　1,572,000
J. DEUBEL
ROTARY ENGINE
Filed April 4, 1921　　　　12 Sheets-Sheet 1

Inventor:
Joseph Deubel,
By his Attorney

Feb. 9, 1926.

J. DEUBEL 1,572,000

ROTARY ENGINE

Filed April 4, 1921        12 Sheets-Sheet 2

Inventor:
Joseph Deubel,
By his Attorney, Geo. F. Miatt

Feb. 9, 1926.

J. DEUBEL

ROTARY ENGINE

Filed April 4, 1921    12 Sheets-Sheet 3

1,572,000

Inventor:
Joseph Deubel,
By his Attorney,
Geo. W. Miatt

Feb. 9, 1926.

J. DEUBEL

ROTARY ENGINE

Filed April 4, 1921     12 Sheets-Sheet 5

Inventor:
Joseph Deubel,
By his Attorney,
Geo. W. Hiatt

Feb. 9, 1926.　　　　　　　　J. DEUBEL　　　　　　　1,572,000
ROTARY ENGINE
Filed April 4, 1921　　12 Sheets-Sheet 9

Inventor
Joseph Deubel,
By his Attorney,
Leo. W. Hiatt

Feb. 9, 1926.
J. DEUBEL
1,572,000
ROTARY ENGINE
Filed April 4, 1921
12 Sheets-Sheet 10

Inventor:
Joseph Deubel,
By his Attorney,
Geo. W. Miatt

Feb. 9, 1926.

J. DEUBEL

1,572,000

ROTARY ENGINE

Filed April 4, 1921   12 Sheets-Sheet 11

INVENTOR:
Joseph Deubel,
BY his Attorney

Feb. 9, 1926.  
J. DEUBEL  
ROTARY ENGINE  
Filed April 4, 1921 — 12 Sheets-Sheet 12

INVENTOR:  
Joseph Deubel,  
By his Attorney,  
Geo. Wm. Miatt

Patented Feb. 9, 1926.

1,572,000

UNITED STATES PATENT OFFICE.

JOSEPH DEUBEL, OF CLIFTON, NEW JERSEY.

ROTARY ENGINE.

Application filed April 4, 1921. Serial No. 458,440.

*To all whom it may concern:*

Be it known that I, JOSEPH DEUBEL, a citizen of the United States, and a resident of Clifton, county of Passaic, and State of New Jersey, have invented certain new and useful Improvements in Rotary Engines, of which the following is a specification.

While the essential features of my invention may be utilized in rotary fluid pressure motors generally, my improvements are designed more especially for, and are herein shown by way of exemplification as embodied in, a rotary gas engine of the combustion type, somewhat similar to that set forth in Letters Patent No. 1,362,400, issued to me Dec. 14, 1920,—main objects in the present case being to attain greater simplicity and economy in both construction and operation, combined with strength and durability, and with a standardization and interchangeability of parts, as and for purposes hereinafter fully set forth,—the invention consisting in the specific construction and arrangement of elements and devices described and claimed whereby these results are accomplished. Other incidental advantages arise from the fact that the operative parts may be arranged for rotation in either direction, according to purposes and requirements of installation; and that a maximum of power and efficiency is attained with expenditure of a minimum of fuel etc.

In the accompanying drawings,

Fig. 3 is a transverse section taken upon plane of line 3—3, Fig. 2;

Fig. 4 is a transverse section of the outer casing and rotatable shaft taken upon plane of line 4—4, Fig. 2, but showing the medial member of the frame work in elevation;

In this connection it may be stated that Figs. 30 and 39; Figs. 31 and 40; Figs. 32 and 41; Figs. 33 and 42; Figs. 34 and 38; and Figs. 35 and 36, are co-related in that the two figures thus named in conjunction show the parts in the same relative positions, as hereinafter more fully set forth.

The main or basic stationary parts of the motor are the medial members F, F, of the framework, the end members F', F², thereof, and external bracket members B, B, mounted on the latter, and the exterior casing $f^3$.

Figure 2:
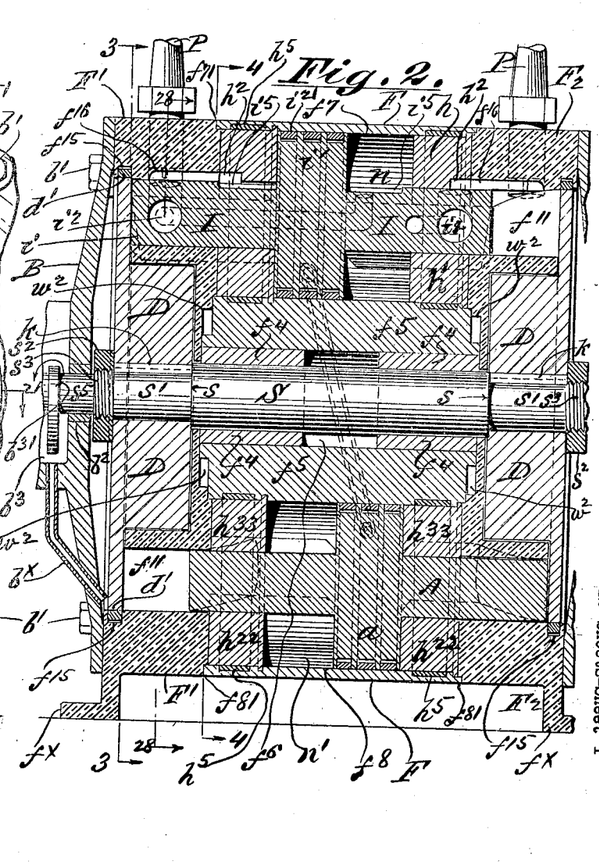
Fig. 2 is a central vertical section thereof taken upon plane of line 2—2, Fig. 1.
Figures 5, 6, 7, 8:
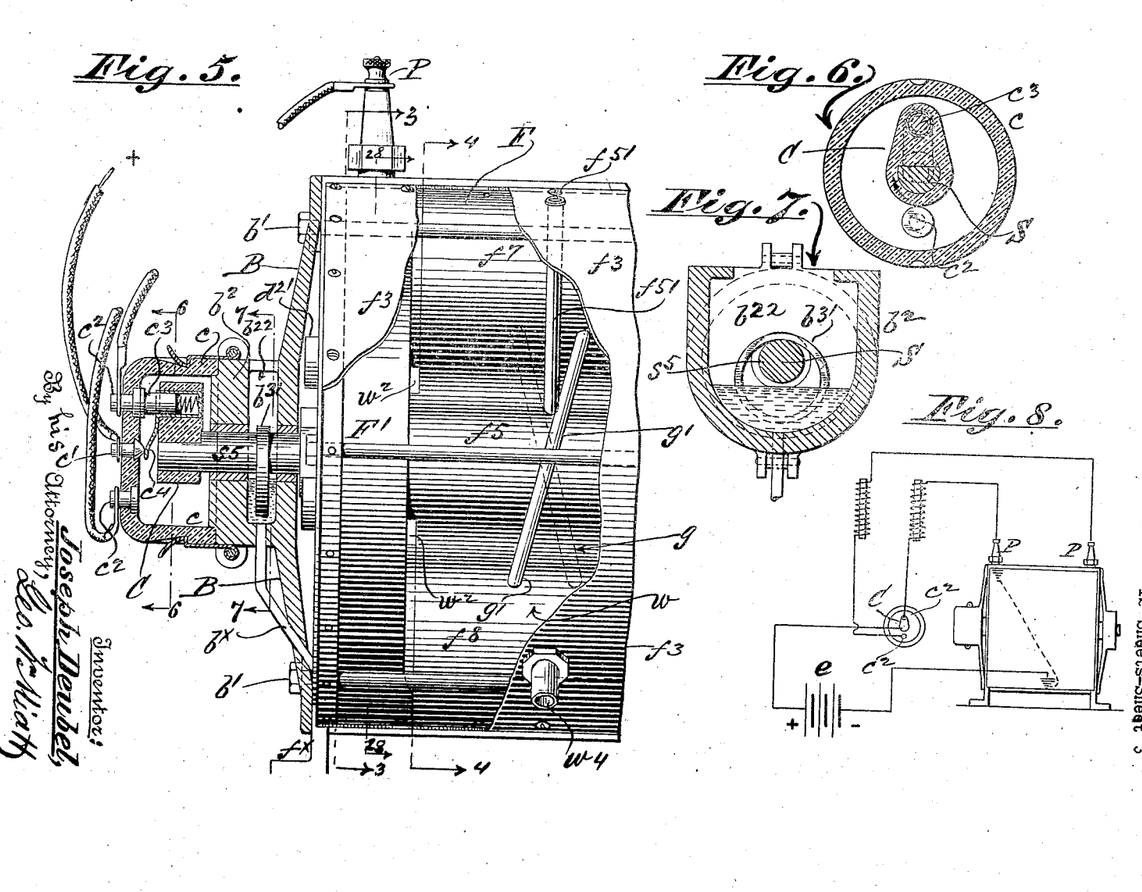
Fig. 5 is a vertical sectional elevation of the commutator end of the engine, with the casing broken away in part.
Fig. 6 is a section of the commutator taken upon plane of line 6—6, Fig. 5, showing contacts etc.
Fig. 7 is a section taken upon plane of line 7—7, Fig. 5, showing the lubricating means.
Fig. 8 is a diagram illustrating the electric sparking circuit.
Figure 21:
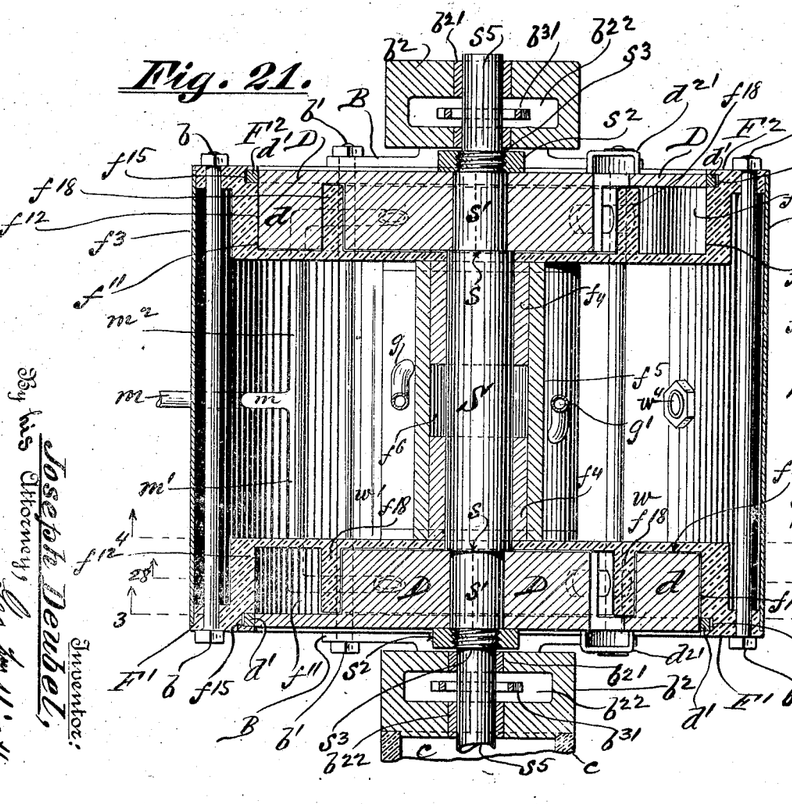
Fig. 21 is a horizontal section taken upon plane of line 21—21, Fig. 1.

The medial or cylinder member F, is supported upon and between the said end members F', F², of the frame, said named frame parts being secured together by bolts b, b, as shown more particularly in Fig. 21, of the drawings,—the end members F', F², being duplicates, which are, however, only inverted as related to each other;—that is to say, they are positioned with their inner faces opposed centrally, and contacting with opposite sides of said medial member F, as will be understood for instance by a comparative examination of Figs. 2, 5, and 21, of said drawings.

The end members F', F², of the frame are each provided or formed with a short standard or foot extension $f^x$, for the support of the motor as a unit, and the shell or casing $f^2$, consisting of the two semi-cylindrical cheek pieces, as indicated in Figs. 3 and 4, is screwed or otherwise secured integrally to the peripheral surfaces of the end members F', F², and to the medial member F, of the frame, as shown particularly in Fig. 4.

The spaces between the said external casing $f^3$, and the medial and end members F, F', F², of the frame is utilized as a water jacket. In this connection it is to be understood that the medial member F, of the frame divides this water jacket into two compartments $w$, $w'$ (Fig. 21), between which are ports $w^2$, for affording circulation,—$w^3$, $w^4$, being water conducting pipes either of which may be used as the inlet or outlet.

Figures 24, 25, 26:
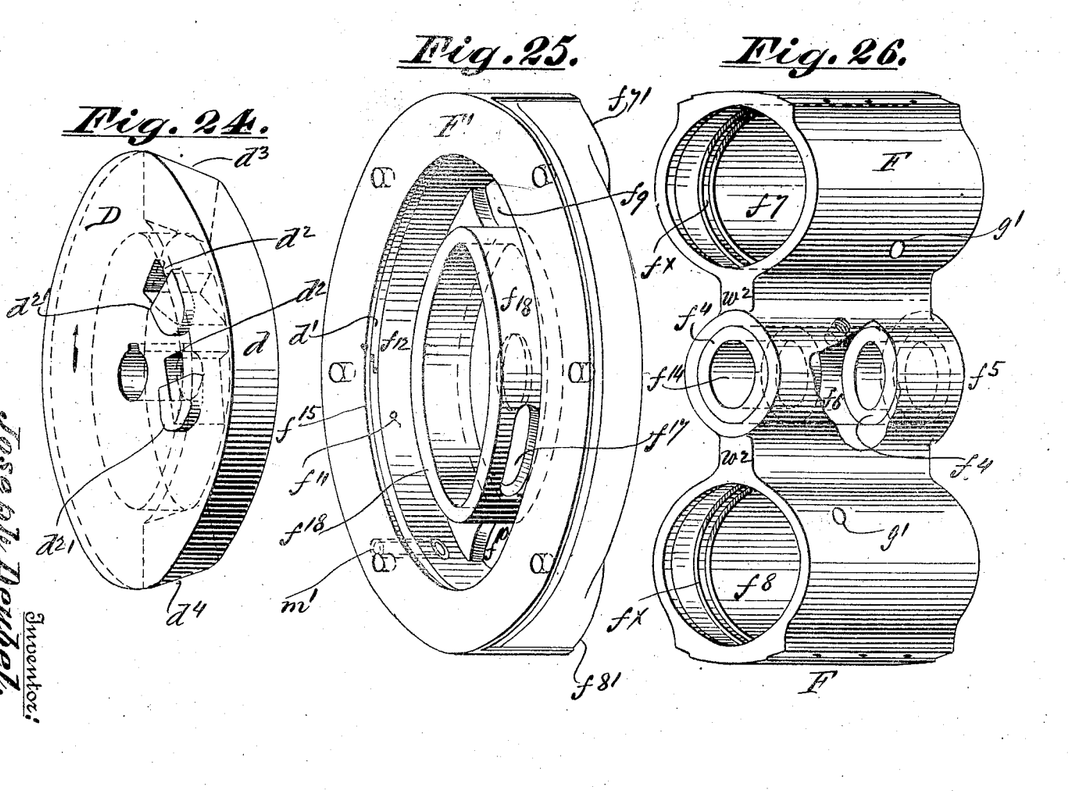
Fig. 24 is a perspective view of one of the duplicate rotatable cam and piston-discs.
Fig. 25 is a perspective view of the end member of the frame shown in Figs. 22 and 23, looking upon the side thereof opposite to that shown in said Fig. 22.
Fig. 26 is a perspective view of the medial or cylinder member of the frame work of the engine.

The rotatable shaft S, is journalled in cylindrical bearing-bushings $f^4$, $f^4$, which are rigidly positioned in opposite ends of the hub portion $f^5$, of the medial frame member F, being driven into the central bore of said hub $f^5$, so as to constitute practically an integral part thereof. These bearing bushings are of such length that an annular chamber $f^6$, is created in the hub $f^5$, between their inner extremities, as will be seen by reference to Figs. 2, 21 and 26, and this annular chamber $f^6$, is supplied with lubricant oil through the medium of the pipe $f^{51}$, indicated by dotted lines in Figs. 1 and 3, and by solid lines in Fig. 5, of the drawings. Thus the lubrication of the main journal of the shaft S, and its bearings $f^4$, $f^4$, is effectually provided for by direct means.

The shaft S, may be formed with shoulders s, s, which, when the said shaft is positioned in the hub portion $f^5$ of the medial frame member F, project beyond the outer ends of the bushings $f^4$, as shown in Figs. 2 and 21, the portions of the shaft S, beyond these shoulders s, s, being of reduced diameter to form seats $s'$, $s'$, upon which the piston cam discs D, D, are mounted, being keyed (k, Figs. 2 and 3) or otherwise rigidly affixed thereto so as to rotate with said shaft S,—the said piston cam discs D, D, being held in position on said seats $s'$, $s'$, and against the shaft shoulders s, s, by nuts $s^2$, $s^2$, engaging with threaded portions $s^3$, $s^3$, of the shaft S, as shown in said Figs. 2 and 21.

Figure 27:
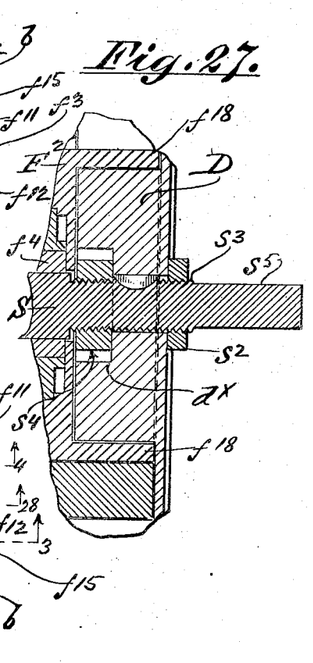
Fig. 27 is a sectional detail showing a specific construction of the means for securing the piston-cam discs to the rotatable shaft.

In the modification shown in Fig. 27, provision is made for compensating for wear between the inner faces of the cam piston discs D, D, and the opposed surfaces of the end members F', F², of the frame, by substituting a bearing nut $s^4$, in lieu of the annular shoulders s, s, on the shaft S, the hub portions of the said piston cam discs D, D, being centrally recessed, as at $d^x$, Fig. 27, to accommodate said bearing nuts $s^4$, which engage with the threaded portions $s^3$, of the shaft S, which threaded portions $s^3$, in this case extend from the annular shoulders s, s, through and beyond said hub portions of the piston cam discs D, D,—the nuts $s^2$, engaging therewith and holding the discs D, D, against the bearing nuts $s^4$.

In either of these constructions the ends of the shaft S, extend in reduced diameter beyond their threaded portions $s^3$, constituting journals $s^5$, $s^5$, which are supported in exterior bearings $b^2$, $b^2$, on the end brackets B, B, which latter are secured to the end members F', F², of the frame work by bolts $b'$, which are also utilized in conjunction with the bolts $b$, integrally uniting the members F, F', F², of the framework of the engine.

The exterior bearings $b^2$, $b^2$, are provided with bushings $b^{21}$, $b^{21}$, and are formed with recesses $b^3$, $b^3$, which function as containers for lubricating oil as shown more particularly in Figs. 5 and 7, of the drawings, rings $b^{31}$, $b^{31}$ of greater diameter than the journals $s^5$, $s^5$, being suspended on the latter to facilitate the distribution of said lubricant.

Figure 1:
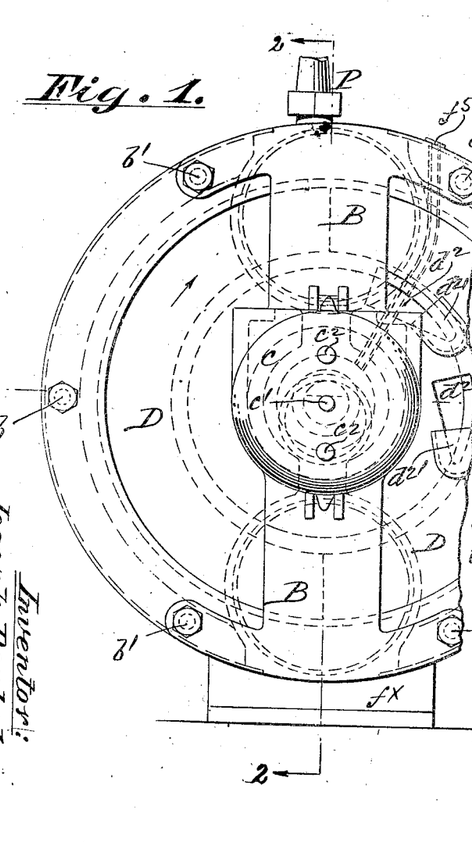
Fig. 1 is an end elevation of a rotary gas motor constructed in accordance with my invention.

Detachably clamped to one of the exterior bearings $b^2$, is the casing $c$, of the commutator C, the latter being shown particularly in Figs. 1, 5 and 6, the central terminal contact $c'$, being electrically connected with source $e$, of electrical current (Fig. 8) while the concentrically positioned and diametrically opposite contacts $c^2$, $c^2$, are connected electrically with the spark plugs P, P,—the rotatable brush-plunger $c^3$, being in continuous electrical connection with the medial contact $c'$, through the medium of the spring tongue $c^4$, as shown in Fig. 5,—and the electric circuits involved being illustrated in Fig. 8. Thus twice during each rotation of the motor shaft S, the electrical circuit is closed, so that the spark plugs P, P, are energized alternately and at opposed timing as related to each other.

The medial member F, of the motor frame is formed with two cylindrical housings $f^7$, $f^8$, one on each side of the hub portion $f^5$, of said medial member F, and diametrically and opposed to each other and as related to the circular end members F, F, of the frame. The inner faces of the latter are formed with annular shoulders $f^{71}$, and $f^{81}$, which coincide with and fit in the ends of said cylindrical housings $f^7$, $f^8$, as shown more particularly in Fig. 2, of the drawings; and the inner faces of said end members F', F², are also formed with openings $f^9$, $f^{10}$, coincident centrally with said cylindrical housings $f^7$, $f^8$, but concentric as related to the hub and shaft S, as will be understood by reference particularly to Figs. 22 and 23, which may be considered as showing either one of the end members F', or F², of the frame in detail.

Figures 22, 43:
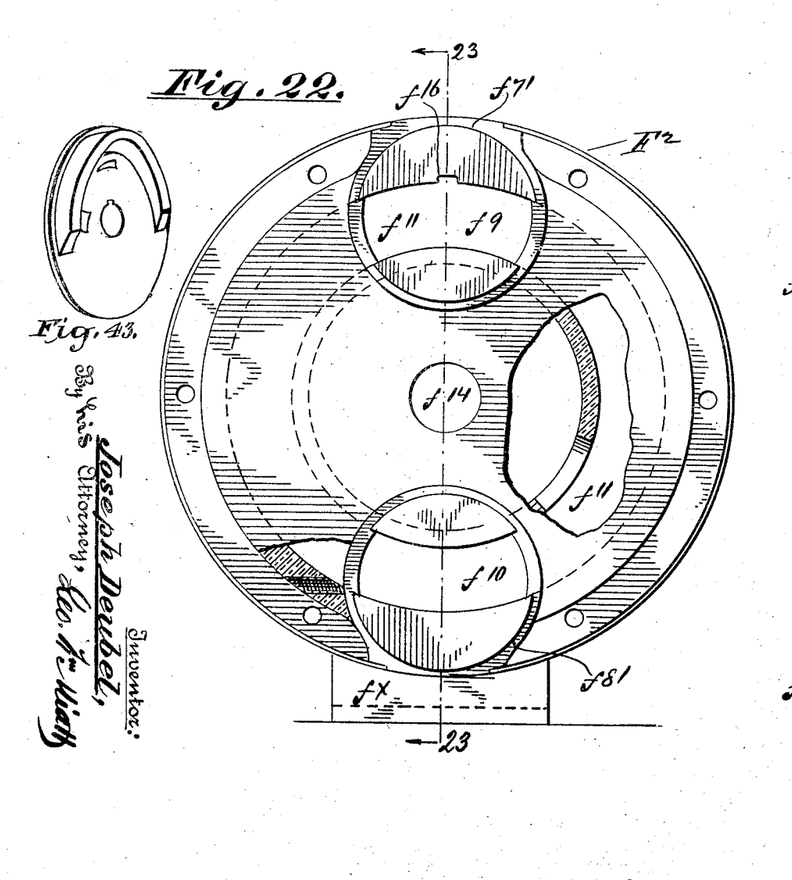
Fig. 22 is an elevation of the inner face of one of the duplicate end members of the frame work of the engine.
Figure 43 is a perspective view looking at the face of the cam.
Figure 23:
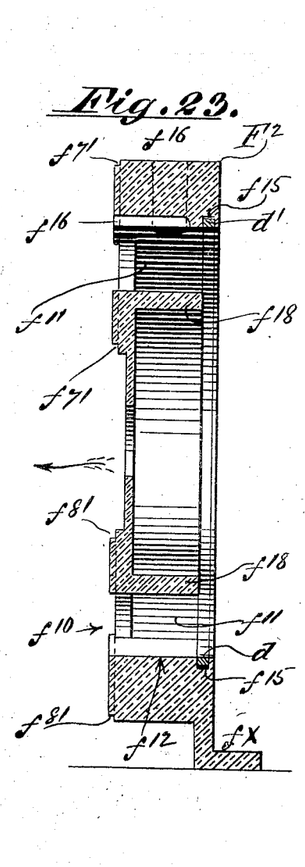
Fig. 23 is a vertical section taken upon plane of line 23—23, Fig. 22.

Incidentally it may be noted in this connection that the said concentric recesses $f^9$, $f^{10}$, in the inner faces of the end members F', F², of the frame coincide with and form entrances to the annular piston cam chamber $f''$, formed in each end member F', F², between the outer wall ($f^{12}$) thereof and its annular flange $f^{18}$, which latter is positioned (as shown in Fig. 22) concentric to the central opening, for the shaft S.

The piston-cam discs D, D, are duplicates in every particular but are mounted on the shaft S, in reversed positions, as related thereto, and to each other, so that their semicircular piston-cam portions $d$, while time-positioned on the shaft S, in opposition to each other, each protrudes into its own piston-cam chamber $f''$, in the end member (F' or F²) to which it is operatively related.

Packing rings $d'$, $d'$, positioned in annular grooves $f^{15}$, $f^{15}$, in the end members F', F², of the frame, contact with the peripheral edges of the piston cam discs D, D, as shown more particularly in Figs. 2 and 21. Said peripheral edges of the discs D, D, and said packing rings $d'$, $d'$, may be lubricated as indicated in Fig. 2, by means of ducts $b^x$, communicating with the lubricant containers $b^3$, hereinbefore described in connection with the exterior bearings $b^2$, or by any other means, as may be found most expedient.

I, is what may be designated for convenience of description as a reciprocatory explosion chamber abutment, which is actuated alternately by the piston-cams $d$, $d$, on the discs D, D. The extremities $i$, $i$, of this reciprocatory firing abutment I, protrude through the recesses $f^9$, $f^9$, in the end members F', F², and enter alternately into the annular piston-cam chambers $f''$, as controlled by the said piston cams $d$. Said firing chamber abutment I, is formed with a medial cylinder piston head $i'$, fitting the cylindrical housing $f^7$, and provided with peripheral packing rings $i^{21}$. Segmental fillets $h$, $h'$, are positioned in the ends of the cylindrical housing $f^7$, and form guide bearings for the ends $i$, $i$, of the said reciprocatory explosion chamber abutment I, as shown in Fig. 4.

Figures 9, 10, 11, 12, 13, 14:
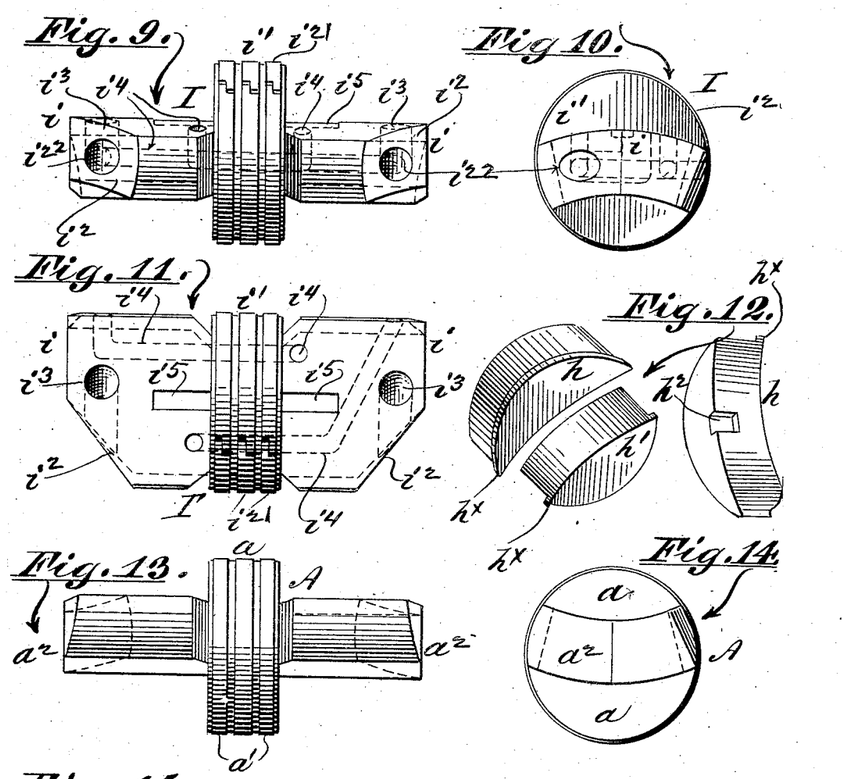
Fig. 9 is an elevation of the upper reciprocatory abutment.
Fig. 10 is an end elevation thereof.
Fig. 11 is an elevation of said upper reciprocatory abutment, taken on a plane at right angles to Fig. 9.
Fig. 12 is a view showing, in perspective, details of the segmental guides used in connection with the upper reciprocatory abutment.
Fig. 13 is an elevation of the lower reciprocatory abutment.
Fig. 14 is an end elevation thereof.
Figures 15, 16:
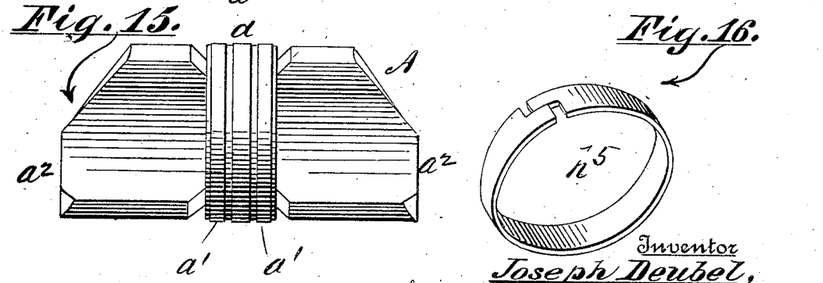
Fig. 15 is an elevation of the lower reciprocatory abutment, taken on a plane at right angles to Fig. 13.
Fig. 16 is a perspective view of one of the split packing rings used in conjunction with the segmental guides.
Figure 17:
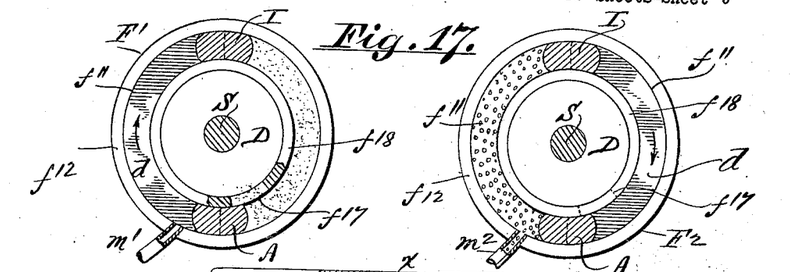
Figs. 17 to 20 inclusive, are diagrammatic views illustrating successive stages (quarter cycles) in the operation of the motor.

The explosive chamber abutment I, is shown in segregated detail in Figs. 9 to 11 inclusive, by reference to which it will be seen that each end $i$, thereof is formed with an inclined surface $I^2$, having an outlet $I^3$, from the explosive chamber $i^3$, the entrance to which is on the upper side of said abutment I, as shown more particularly in Fig. 11. $i^4$, $i^4$, are induction channels connecting opposite ends of the abutment I, with opposite sides the medial piston head $i$, as indicated in dotted lines in Fig. 11; and $i^5$, $i^5$, are by-pass grooves situated on the upper side of said abutment I, one on either side of the said medial piston head $i'$. By reference to Fig. 2, it will be understood that these by-pass grooves $i^5$, $i^5$, are adapted to communicate alternately with recesses $h^2$, in the under sides of the upper fillet bearing segments $h$, which fillet recesses $h^2$, $h^2$, in turn open into channels $f^{16}$, $f^{16}$, formed in the side frames F', F², and communicating with the annular piston-cam chambers $f''$, $f''$, in said side members F', F², of the frame adjacent to the inner ends of the spark plugs P.

The lower reciprocatory abutment A, which may be designated as the auxiliary compression transfer and reversal abutment, is formed with a medial piston head $a$, fitting within the cylindrical housing $f^8$, and provided with peripheral packing rings $a'$, $a'$. The ends $a^2$, $a^2$, of this supplementary reciprocatory abutment A, on either side of said piston head $a$, are projected alternately into the annular piston-cam chambers $f''$, $f''$, in the side members F', F², under the control of the piston-cams $d$, on the rotatable discs D. The lower reciprocatory abutment A, is of solid construction, having no ports or channels; and the lower cylindrical housing $f^8$, functions as a storage compression chamber, being connected with the opposite sides of the upper cylindrical housing $f^7$, by means of cross conduits $g$, $g'$,—said upper cylindrical housing $f^7$, constituting the main compression chamber. That is to say, the piston head $i'$, of the explosive chamber abutment I, compresses a gas charge within the cylinder $f^7$, alternately on opposite sides thereof, while the piston head A, in the lower cylinder $f^8$, acts in conjunction with the upper one $i$, through the medium of said cross conduits $g$, $g'$, to augment the compression of the gas charge prior to its introduction into one of the explosive chambers $i^3$.

The lower cylindrical housing $f^8$, is provided with segmental fillets $h^{22}$, $h^{33}$ (see Fig. 2), which act as guides and lateral supports for the end members $a^2$, $a^2$, of said auxiliary reciprocatory abutment A. Flanges $h^x$ (Fig. 12), on the peripheral edges of these segmental fillets $h$, $h'$, $h^{22}$, $h^{33}$, fit in grooves in the casing to hold them in position in the ends of the cylinders $f^7$, $f^8$; and split peripheral packing rings $h^5$, are provided which encircle both fillets and abutment ends, as indicated in Fig. 2.

Figure 28:
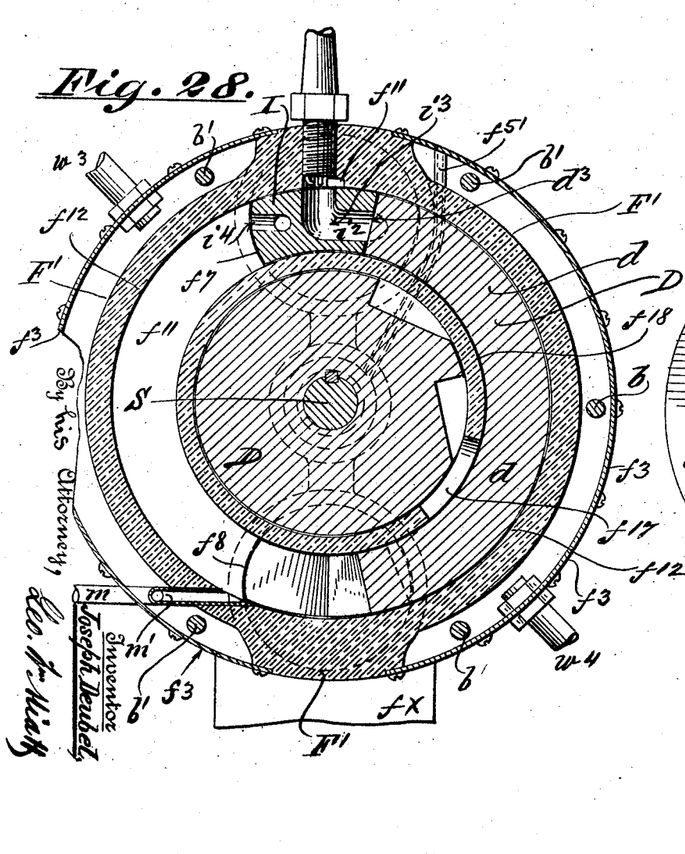
Fig. 28 is a vertical section taken upon plane of line 28—28, Fig. 2.
Figure 29:
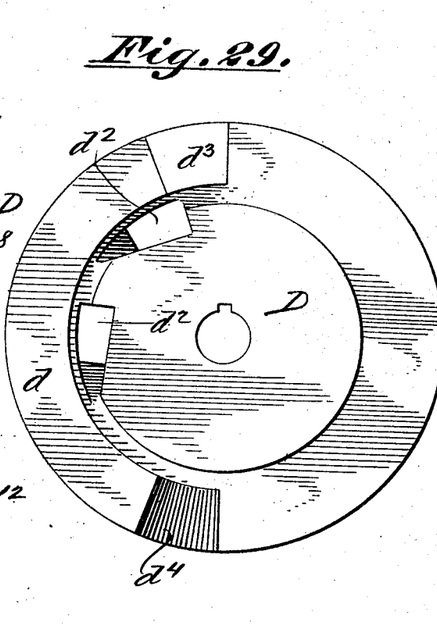
Fig. 29 is an elevation of the inner face of one of the piston-cam discs.

By reference particularly to Figs. 28 and 29, it will be seen that the duplex piston-cam discs D, are each formed with discharge ports $d^2$, $d^2$, adjacent to the semi-circular piston-cam portions $d$, and these rotatable discharge ports $d^2$, $d^2$, are so positioned upon said discs D, D, as to act in conjunction with the outlet ports $f^{17}$, formed in the annular flanges $f^{18}$, consisting each of an integral part of one of the side members F′, F², of the frame work,—each of said annular flanges $f^{18}$, constituting the inner side wall of one of the annular chambers $f''$, in which the said piston-cams $d$, revolve concentrically around the axis of the motor. These rotatable discharge ports $d^2$, $d^2$, open through the discs D, D, directly into the atmosphere, exterior deflectors $d^{21}$, $d^{21}$, being preferably provided which tend to muffle the discharge.

Fig. 21, shows the main supply pipe $m$, communicating with the usual carburetter, not shown. This main supply pipe $m$, in the construction shown in the drawings, has two branches $m'$, $m^2$, communicating respectively with the opposite ends of the motor. Thus the branch pipe $m'$, communicates with the lower portion of the annular piston-cam chamber $f''$, on what, for convenience of description in connection with the drawings, particularly Figs. 1, 2 and 5, thereof, may be designated as the left hand end of the motor, while the branch pipe $m^2$, communicates in a similar manner with the lower portion of the annular piston-cam chamber $f''$, on what, for a like reason, may be designated as the right hand end of the motor.

With this understanding, the functioning of the motor may be described as follows.—remembering that the operations are duplicated on each end of the machine, only inversely as related to each other as to time and condition of sequence,—the inner faces of the piston-cam discs being opposed to each other so that the piston-cam portion on one cam disc is diametrically opposed in position as compared with the corresponding piston-cam portion on the other cam disc.

Thus, starting with the left end of the motor, the aerified gas derived from the carburetter is introduced through the branch inlet pipe $m'$, into the lower part of the annular piston-cam chamber $f''$, and is driven by the advancing cam end $d^3$, of the piston into the induction channel $i^4$, in the adjacent end of the reciprocatory abutment I, and through the latter and beyond its piston head $i'$, into the space $n$, in the cylindrical housing $f^7$, to the right of said piston $i$, with the parts in the position shown in Fig. 2. The said cylindrical space $n$, being connected by the conduit $g'$ (see Figs. 4 and 5), with the space $n'$, to the left of the piston head $a$, in the storage cylinder $f^8$, below. A portion of the gas charges passes through said conduit $g'$, to said supplementary space $n'$. When the cam ends $d^3$, of the piston-cam portions $d$, of the rotatable discs D, encounter and shift the abutments I, A, simultaneously in opposite directions, a portion of the gas charge in the said cylindrical spaces $n$, $n'$, is forced by the piston heads $i'$, $a$, into the said conduit $g'$, the ends of which are finally covered and sealed by the advance of the pistons $i'$, $a$. By this time one of the central grooves $i^5$, of the abutment I, is in communication with the recess $h^2$, in the fillet $h$, at that end of the cylinder $f^7$, and with the corresponding channel $f^{16}$, in the frame thereby allowing the portion of the charge that is to be fired to enter the explosion chamber $i^3$, in that end of the abutment I. Thus at the completion of the stroke of the abutment I, in the direction above set forth the firing charge in said explosion chamber $i^3$, is brought into coincidence with the spark plug P, at that end of the motor, which plug P, is timed to ignite such charge upon such coincidence therewith, as will be understood by reference more particularly to Fig. 28, which shows the relation of the adjacent parts at the firing instance, so that the full effect of the explosion is exerted against the piston end surface $d^3$, of the disc D,—the rotation of which has just brought said piston end surface $d^3$, into contactual coincidence with the inclined surface $i^2$, of the abutment I, in which the discharge outlet $i^2$, of the said combustion chamber $i^3$, is situated. The expansion of the charge thus fired is exerted with full force against the piston cam end $d^3$, until the latter reaches the discharge port $f^{17}$, in the annular flange $f^{18}$, constituting the inner wall of the annular chamber $f''$, as before stated, when the products of combustion escape into the atmosphere after impinging against the deflectors $d^{21}$.

Figure 18:
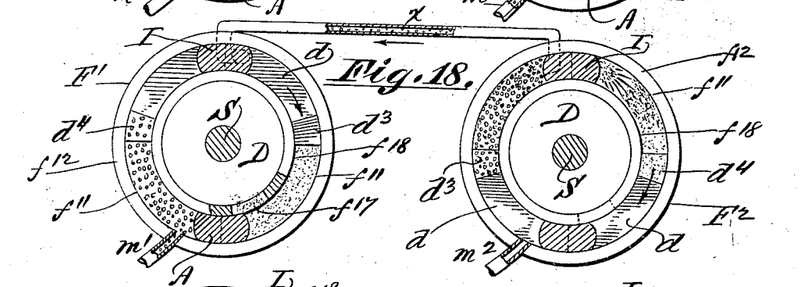
Figure 19:
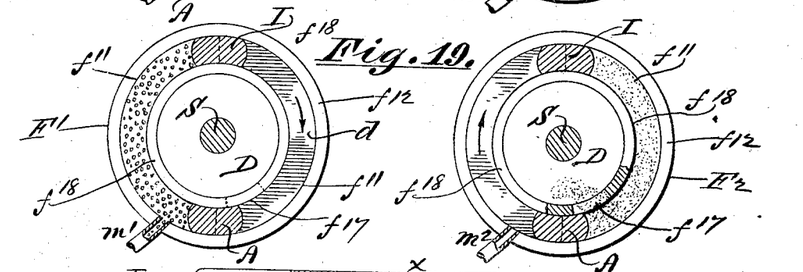
Figure 20:
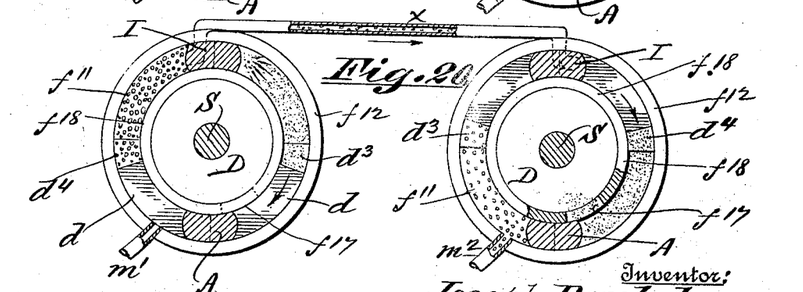

During the retractile movements of the abutment I, A, from those above set forth, the ends of the cross conduit $g'$, are again uncovered by the pistons $i'$, $a$, allowing the gas contained in said cross conduit $g'$, to expand into both cylinders $f^7$, and $f^8$, thereby tending to balance and cushion the reciprocatory movements of the pistons and counteract back suction or pressure. Another important function performed by the auxiliary cylinder $f^8$, piston $a$, and the connective cross conduits $g$, $g'$, is to materially augment the available area of gas compression, and to maintain a surplus of gas within the motor the alternate expansion and contraction of which not only acts as an elastic resilient cushion medium, but also affords an initial internal pressure at all times available in rendering the firing charges uniform in quantity and degree of compression as fed to the combustion chambers $i^3$, it being understood of course that the cycle of operations above described as ocurring in the left end of the motor is duplicated in the right end thereof, only inversely as related to time,—the explosions being alternate on either side of the motor, and there being two such impulses imparted to the discs D, D, and shaft S, at each rotation thereof. In this connection the diagrammatic views from 17 to 20 of the drawings inclusive may be referred to as illustrating the successive relative steps in quarter cycles of the operations in opposite ends of the motor, the diagrams on the left side of each figure representing conditions in the left end of the motor and those on the right of each figure representing the coincidental conditions in the right end of the motor, and the conduits $x$, in Figs. 18 and 20, representing the means of communication (collectively) through the reciprocatory inlet and abutment I, between the annular chambers $f''$, $f'''$, situated at opposite ends of the motor as hereinbefore set forth.

By my improved construction and arrangement of parts I attain a simple, inexpensive, durable, rotary motor which is easy running, effective, and economical of fuel as related to power developed thereby. This I accomplish through the medium of relatively few parts, without the aid of springs, valves, cranks or gearing, of any kind,—the parts being evenly balanced in both construction and operation, and frictional resistance being reduced to a minimum. Furthermore by the duplication of parts set forth I am enabled to assemble and install the same with equal facility for use either as a right hand or as a left hand motor, thus adapting my motor readily to special requirements and uses, as, for instance, for twin screw motor boats, aeroplanes, etc., and under other conditions in which either or both right and left hand motors are a desideratum.

Figure 30:
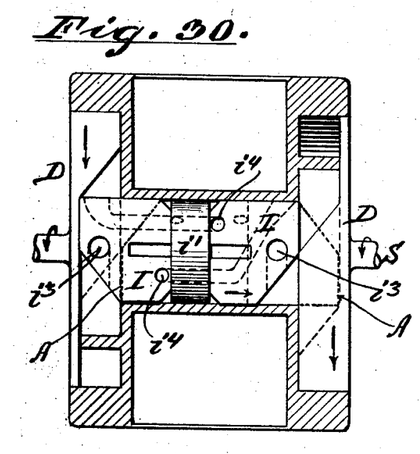
Figs. 30 to 42 inclusive are diagrammatic views illustrating the various relative positions of the parts during the operation of the motor.
Figure 31:
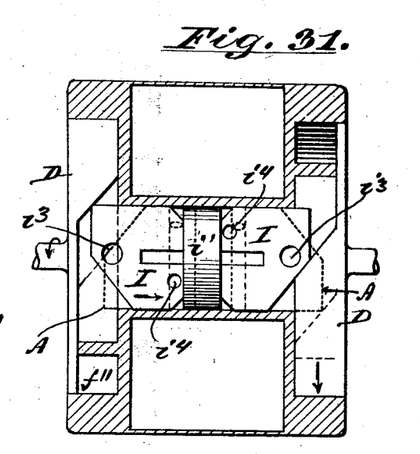
Figure 32:
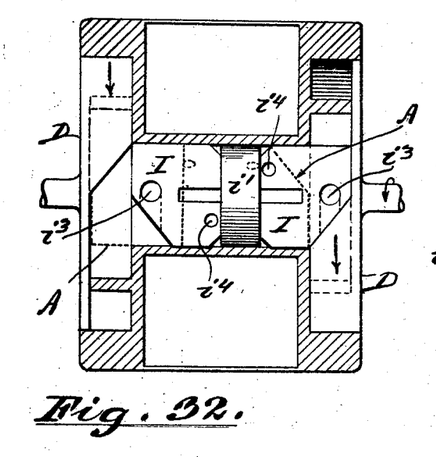
Figure 33:
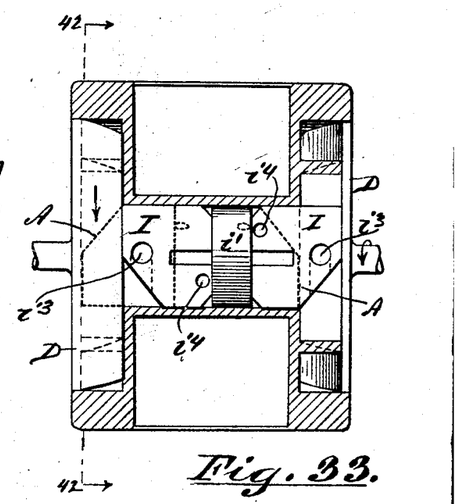
Figure 34:
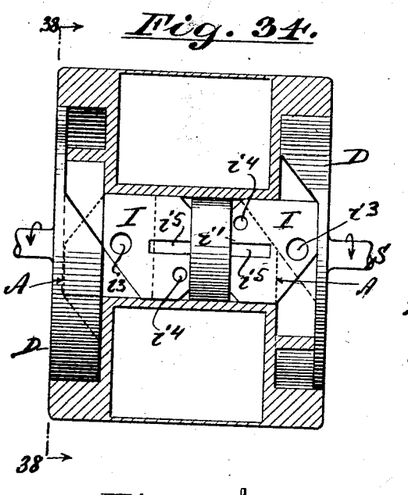
Figure 35:
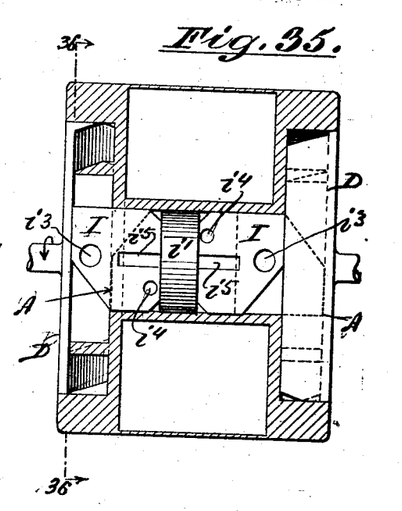
Figures 36, 37, 38:
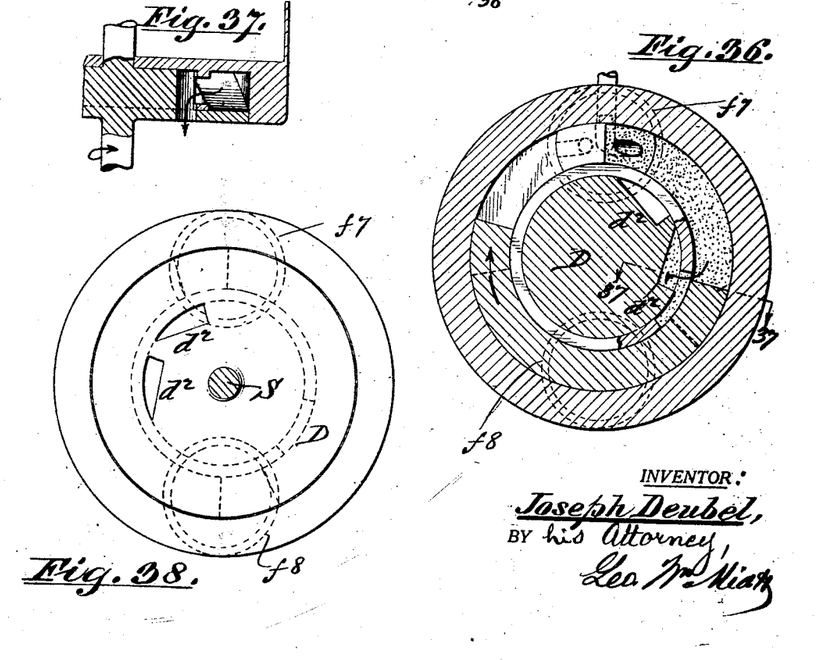
Figure 39:
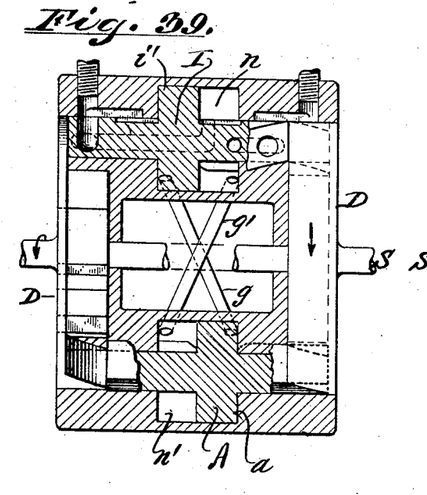
Figure 40:
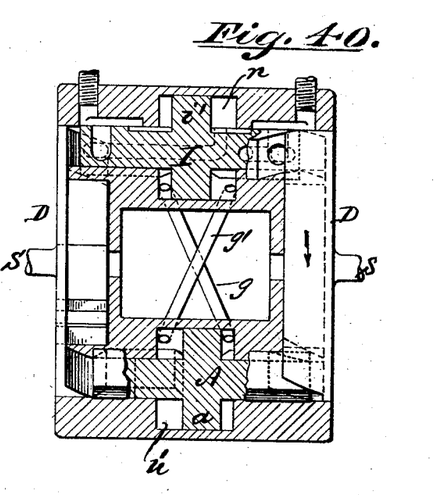
Figure 41:
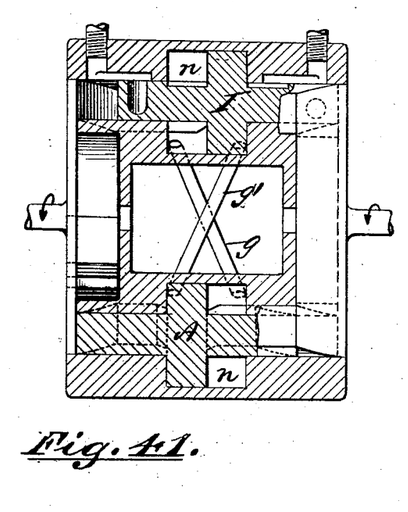
Figure 42:
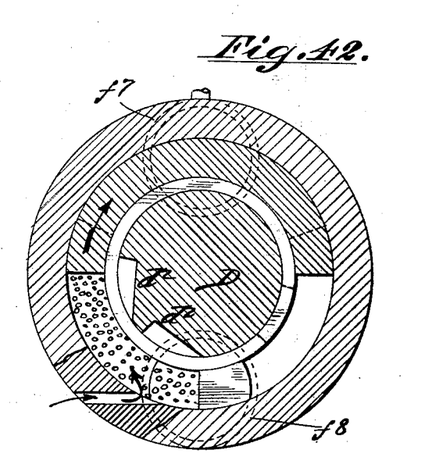

The diagrammatic Figs. 30 and 39 illustrate the positions of the upper abutment I, and the lower abutment A, prior to their simultaneous movements in opposite directions under the influence of the piston cam discs D, D. In Figs. 31 and 40, both abutments are compressing the gas into the chambers $n$, $n$, through the medium of the auxiliary conduits $g$, $g'$. In Figs. 32 and 41 the abutments have travelled their full distances, the abutment I, from left to right and the abutment A, from right to left,—the piston heads having closed the auxiliary passages after compressing all the gas into the combustion chamber. In Figs. 33 and 42 the left side is sucking in gas, and the right side is discharging the products of combustion. Fig. 34 illustrates the relative positions of the abutments just prior to the beginning of their retractile strokes. Figs. 35 and 36 illustrate the return of the abutments to their original positions as in Figs. 30 and 39. Fig. 37 is a detail taken upon plane of line 37—37, Fig. 36; and Fig. 38 is a sectional elevation taken upon plane of line 38—38, Fig. 34.

What I claim as my invention and desire to secure by Letters Patent is:

1. In a rotary engine of the character designated, the combination with the stationary frame work and rotatable shaft mounted therein of duplicate piston-cam discs rigidly attached to said shaft and inversely opposed to each other, reciprocatory abutments controlled by said piston-cam discs, one of which is formed with longitudinal transfer ports, the auxiliary abutment endwise movable relatively to the piston head, compression pistons on said reciprocatory abutments, medial compression cylinders in which said reciprocatory pistons are positioned, conduits connecting the opposite ends of said compression cylinders, annular channels into which the piston cams on said rotatable discs protrude, means for introducing gas into said annular channels, and for alternately firing the charges as compressed in said annular channels, for the purpose described.

2. In a rotary engine of the character designated, the combination with the stationary frame work, of a rotatable shaft mounted therein, duplicate piston-cam discs rigidly attached to said shaft and formed with piston-cam portions inversely positioned as related to each other, said piston-cam portions being protuberant into annular chambers formed for the purpose in the casing, means for supplying gas to said annular chambers, a reciprocatory port abutment actuated and controlled by said piston-cam portions, of the rotatable discs, and sparking means for firing the charges alternately, substantially in the manner and for the purpose described.

3. In a rotary engine of the character designated, the combination with the framework formed with annular piston-cam chambers, the piston-cam discs, and rotatable shaft on which they are rigidly mounted, of a reciprocatory abutment actuated and controlled by said piston-cam discs, and formed with a medial piston head positioned in a cylindrical housing and also formed with induction channels, by-pass grooves, and explosion chambers by means of which communication is established alternately with said annular piston-cam channels, together with means for alternately firing the charges in the latter, for the purpose described.

4. In a rotary engine of the character designated, the combination with the framework, formed with annular piston-cam chambers, the piston-cam discs, and rotatable shaft on which they are rigidly mounted, of a reciprocatory abutment actuated and controlled by said piston-cam discs, and formed with a medial piston head positioned in a cylindrical housing and also formed with induction channels, by-pass grooves and explosion chambers by means of which communication is established alternately with said annular piston-cam channels, together with means for alternately firing the charges in the latter, and for effecting the discharge of products of combustion through ports in said rotatable discs, as and for the purpose set forth.

5. In a rotary engine of the character designated, in combination a medial member of the frame formed with a central section in which a rotatable shaft is mounted, said rotatable shaft having rigidly secured thereto piston-cam discs, outer end frame members formed with annular flanges constituting the inner sides of annular piston-cam chambers, said annular flanges being formed with discharge ports for the products of combustion, and said piston-cam discs formed with discharge ports in concentric alignment with said discharge ports in said annular flanges on the end members of the frame, for the purpose described.

6. In a rotary engine of the character designated, the combination with the frame work formed with duplicate annular piston-cam chambers, piston-cam discs of a reciprocatory abutment actuated by the piston-cam discs, and formed with end combustion chambers and intermediate inlet channels, substantially as and for the purpose described.

7. In a rotary engine of the character designated, the combination with the frame work formed with duplicate annular piston-cam chambers, piston-cam discs and a medial cylindrical chamber, of a reciprocatory abutment actuated by the piston cam discs and formed with a medial piston head fitting in said cylindrical chamber, and also formed with end combustion chambers and with intermediate inlet channels, for the purpose described.

8. In a rotary engine of the character designated, the combination with the frame work formed with duplicate annular piston-cam chambers and with medial cylindrical chambers, piston-cam discs of reciprocatory abutments positioned in said medial cylindrical chambers and actuated by the piston cam discs, cross conduits connecting the opposite ends of said medial cylindrical chambers and medial pistons on said reciprocatory abutments, one of the latter being formed with end combustion chambers and with intermediate inlet passages, for the purpose described.

9. In a rotary engine of the character designated, the combination with the frame work formed with duplicate annular piston-cam chambers, of duplicate piston-cam discs rigidly mounted on the rotatable shaft and interchangeable thereon, for the purpose described.

10. In a rotary engine of the character designated, the combination with the frame work formed with duplicate annular piston-cam chambers, of a rotatable shaft, and duplicate piston-cam discs rigidly mountable on the rotatable shaft and interchangeable thereon, each disc being formed with a semi-circular concentric piston-cam portion, and with discharge ports, for the purpose described.

11. In a rotary engine of the character designated, the combination with the frame work formed with duplicate annular piston-cam chambers, of duplicate piston-cam discs rigidly mountable on the rotatable shaft and interchangeable thereon, each disc being formed with a semi-circular concentric piston-cam portion, with discharge ports, and with deflectors opposed externally to said discharge ports, for the purpose described.

12. In a rotary engine of the character designated, the combination with the frame work formed with duplicate annular piston-cam chambers and with medial cylindrical chambers, of reciprocatory abutments positioned in said medial cylindrical chambers and actuated by the piston-cam discs, cross conduits connecting the opposite ends of said medial cylindrical chambers, and medial pistons on said reciprocatory abutments, one of the latter being formed with end combustion chambers and with intermediate inlet passages, said medial cylindrical chambers being provided with end fillet segments, substantially as and for the purpose described.

13. In a rotary engine of the character designated, the combination with the frame work formed with duplicate annular piston-cam chambers, of a rotatable shaft, piston-cam discs rigidly attached to the rotatable shaft and operating in conjunction with said annular chambers in the frame work, annular packing rings seated in said frame work and contacting with the peripheral edges of said piston-cam discs, and means for lubricating said peripheral edges of the piston-cam discs, for the purpose described.

14. In a rotary engine of the character designated, the combination with the frame work formed with duplicate annular piston-cam chambers of a rotatable shaft, piston-cam discs rigidly mounted on the rotatable shaft by adjustable wear-compensating means, for the purpose described.

15. In a rotary engine of the character designated, a rotatable shaft, a supporting frame comprising a medial section formed with central bearings for the rotatable shaft and with diametrically opposed cylindrical chambers, and end members fitted to said medial section and formed with annular piston-cam chambers, for the purpose described.

16. In a rotary engine of the character designated, a rotatable shaft, a supporting frame comprising a medial section formed with central bearings for the rotatable shaft and with diametrically opposed cylindrical chambers, and end members fitted to said medial section and formed with annular piston-cam chambers, the inner walls of which consist of annular flanges provided with discharge ports, for the purpose described.

17. In a rotary engine of the character designated, a rotatable shaft, a supporting frame comprising a medial section formed with central bearings for the rotatable shaft and with diametrically opposed cylindrical chambers, end members fitting said medial section and formed with annular piston-cam chambers, encasements enclosing the spaces between said medial section and said end members, and constituting water jackets therefor, and ports in said medial section connecting the said water jackets, together with means of effecting a circulation of water therethrough, for the purpose described.

JOSEPH DEUBEL.